United States Patent

Baliga et al.

[11] Patent Number: 5,914,489
[45] Date of Patent: Jun. 22, 1999

[54] CONTINUOUS OPTICAL PATH MONITORING OF OPTICAL FLAME AND RADIATION DETECTORS

[75] Inventors: Shankar Baliga, Irvine; Brett Bleacher, Aliso Viejo, both of Calif.

[73] Assignee: General Monitors, Incorporated, Lake Forest, Calif.

[21] Appl. No.: 08/900,205

[22] Filed: Jul. 24, 1997

[51] Int. Cl.[6] .............................. G01J 5/08; G01J 5/04
[52] U.S. Cl. .............................. 250/339.05; 250/339.15; 250/353; 250/372
[58] Field of Search ............... 250/341.1, 339.05, 250/339.06, 252.1 A, 353, 372, 227.11, 227.29, 559.41, 554, 339.15; 359/350, 351

[56] References Cited

U.S. PATENT DOCUMENTS

| | | |
|---|---|---|
| 3,952,196 | 4/1976 | Larsen . |
| 4,199,682 | 4/1980 | Spector et al. .................. 250/339.05 |
| 4,365,896 | 12/1982 | Mihalow . |
| 4,369,364 | 1/1983 | Kuntermann . |
| 4,405,234 | 9/1983 | Juaire . |
| 4,435,093 | 3/1984 | Krause et al. . |
| 4,529,881 | 7/1985 | Ceurvels et al. . |
| 4,544,843 | 10/1985 | Kern et al. . |
| 4,547,673 | 10/1985 | Larsen et al. . |
| 4,560,874 | 12/1985 | Cinzori et al. ..................... 250/342 |
| 4,709,153 | 11/1987 | Schofield ........................... 250/353 |
| 4,728,794 | 3/1988 | Allen . |
| 4,826,316 | 5/1989 | Odum . |
| 5,065,025 | 11/1991 | Doyle . |
| 5,325,171 | 6/1994 | Shimizu ......................... 250/252.1 A |

*Primary Examiner*—Constantine Hannaher
*Assistant Examiner*—Darren M. Jiron
*Attorney, Agent, or Firm*—Larry K. Roberts

[57] ABSTRACT

Apparatus for the optical detection of flames or explosions, having an optical structure to perform continuous optical path monitoring of the optical window receiving the optical radiation, to ensure against the buildup of radiation absorbing or scattering materials. A light source internal to the housing illuminates a straight optically transmissive quartz or sapphire rod that protrudes through the housing beyond the optical window. The protruding tip of the light rod is beveled and metallized on the bevel to provide internal reflection of the light from the source, the angle of the bevel being such that the reflected light on exiting the light rod illuminates the optical window and the optical detector behind it, thereby providing a test for the cleanliness of the optical window. This optical technique for checking the cleanliness of the optical viewing element can be utilized by other optical instruments including imaging arrays, surveillance cameras and weapons.

29 Claims, 5 Drawing Sheets

CONTINUOUS OPTICAL PATH MONITORING OF OPTICAL FLAME AND RADIATION DETECTORS

TECHNICAL FIELD OF THE INVENTION

This invention relates to optical radiation detection systems such as those used for detecting flames by means of the ultraviolet and/or infrared radiation they emit. More particularly, it relates to an apparatus to perform continuous optical path monitoring of the optical viewing window to detect the accumulation of optically attenuating objects or matter on the window's surface.

BACKGROUND OF THE INVENTION

Optical radiation detectors that utilize ultraviolet and infrared detectors for flame detection are used in many installations where a fast and reliable response to a fire is required. Various combinations of ultraviolet (UV) and infrared (IR) detectors are used such as UV only, UV and IR, dual IR, triple IR, and CCD or IR array cameras depending on the type of facility to be monitored and the environmental conditions. In locations where the flame may be the result of an explosion, such as in petrochemical plants and storage areas for flammable materials, the optical detector is enclosed in an explosion-proof housing. The area to be protected is viewed by the detector through an explosion-proof optical window typically made of quartz or sapphire.

In order for an optical flame detector to operate correctly, it is clearly necessary to ensure that the window is always sufficiently clean to enable the optical radiation detector element to receive the radiation to be detected. An arrangement to enable the cleanliness of the window to be checked is therefore required. This test needs to be performed at sufficiently close and periodic intervals and is referred to herein as Continuous Optical path Monitoring (COPM). The test also checks the operation of the optical flame detector and circuitry in addition to checking the cleanliness of the window. If a separate optical detector is used for the COPM test, this auxiliary detector will only check the cleanliness of the optical window but not the operation of the whole instrument.

The requirement for the cleanliness of the optical viewing window or lens is not limited to optical flame detectors, but is a general requirement for satisfactory operation of optical instruments such as infrared and optical cameras, imaging arrays, optical surveillance equipment and weapons. Cleanliness of the outermost optical component is a concern when the equipment is operated in a harsh industrial or military environment.

An arrangement using an external test lamp mounted on the housing to provide the optical illumination does not satisfy the requirements of certain industry specifications, which require that the test lamp be positioned inside the explosion-proof housing. In U.S. Pat. No. 4,529,881, the viewing window is recessed in a housing cavity with a flared wall. The test radiation is applied from a lamp in a portion of the housing that extends forward of the plane of the viewing window. This approach leads to complexity in design to ensure the explosion—proofing of the test lamp, increased expense in fabricating the housing, and interference of the protruding housing with the optical field of view of the flame detector.

Another approach, taken in U.S. Pat. No. 3,952,196, and U.S. Pat. No. 4,547,673, is to reflect light from a lamp inside the housing off a reflective metal ring or surface fixed to the outside of the housing. Such systems can give a false indication of impaired performance, as the test light passes twice through the viewing window, and must be reflected from a surface which may be corroded or covered with an accumulation of dirt.

Drawbacks of the reflective ring approach have been addressed in systems which utilize a lamp inside the housing that is positioned so that light is reflected back from the exterior surface of the optical window, by total internal reflection, onto the optical detector. In U.S. Pat. No. 4,405,234, the light is deflected by using beveled windows. In U.S. Pat. No. 4,826,316, the beveled window is replaced with a flat deflecting mirror to eliminate the high cost of the beveled window. The internal reflection approach works well for deposits of dust or contaminants directly on the window's exterior surface. However, blockage of the optical path due to non-deposits, such as a spider and spider web over the window, will not necessarily be detected. Since the optical window is recessed in the housing due to the explosion-proof requirements on the packaging this possibility is quite real. U.S. Pat. Nos. 4,405,234 and 4,826,316 illustrate the projection of the housing beyond the plane of the optical window. Additionally, the correlation between the deposit buildup on the window and the change in internally reflected light is difficult to characterize and quantify as the deposit in a rugged industrial environment can be of different materials with unknown optical properties. The internal reflection technique, therefore, does not test the actual optical path taken by the incoming radiation between the outside of the optical window and the edge of the housing.

It would therefore be an advance in the art to provide an optical flame detection apparatus with enclosed and protected elements to periodically check the transparency and cleanliness of the optical viewing window.

It would also be advantageous to provide an optical flame detection apparatus with enclosed and protected elements to periodically check the operation of the optical flame detector.

Yet another advantage would be to provide an optical instrument such as a camera or an imager with enclosed and protected elements to periodically check the transparency and cleanliness of the optical viewing window, and the operation of the instrument.

It would further represent an advance in the art to improve the optical field of view of the flame detector.

It would represent yet another advantage to illuminate the entire optical viewing window and optical radiation detector, and thereby check cleanliness of the entire window in contrast to checking only a section of the window.

Another advance in the art would be to provide for a flame detection apparatus that can operate in corrosive environments.

SUMMARY OF THE INVENTION

In accordance with one aspect of the invention, an enclosed housing is employed, with one or more optically transparent windows at one end. Optical radiation detectors such as ultraviolet (UV) and infrared (IR) detectors are enclosed in the housing behind the optical windows. A light source which generates UV or IR radiation as appropriate, is adjacent to but optically shielded from the optical radiation detector. Light from the source is channeled into a straight optically transmitting light rod made of quartz, sapphire or other suitable material that projects a short distance out from the housing. The protruding end of the light rod is beveled and metallized on the bevel, so that the light traveling through the light rod is reflected off the mirrored bevel surface, exits the light rod and illuminates the optical window and the optical detector. By this method, the window is checked for cleanliness using light that propagates through the window once only, and does not use external reflective rings or internal reflection off the surface of the optical window. The sides of the light rod can also be metallized to increase the light guiding effect and prevent optical losses which may be caused by the epoxy holding the rod.

In accordance with a further aspect of this invention, the mirror surface is deposited onto the beveled end of the light rod. Light reflection occurs from the quartz/metal surface which is never exposed to the environment. For added protection, the back of the mirror may be coated with a protective material. Further, the protruding light rod is mechanically protected by a projecting cover on the housing such that only the portion of the light rod where the light exits need be exposed to the environment, thereby explosion-proofing of the entire sensor. The use of the straight light rod with beveled reflector also reduces the blockage of the sensor's optical field of view which could arise if the light rod is bent over the optical window, i.e. there is an increase in optical field of view due to the reduced obstruction.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

Figure 1:
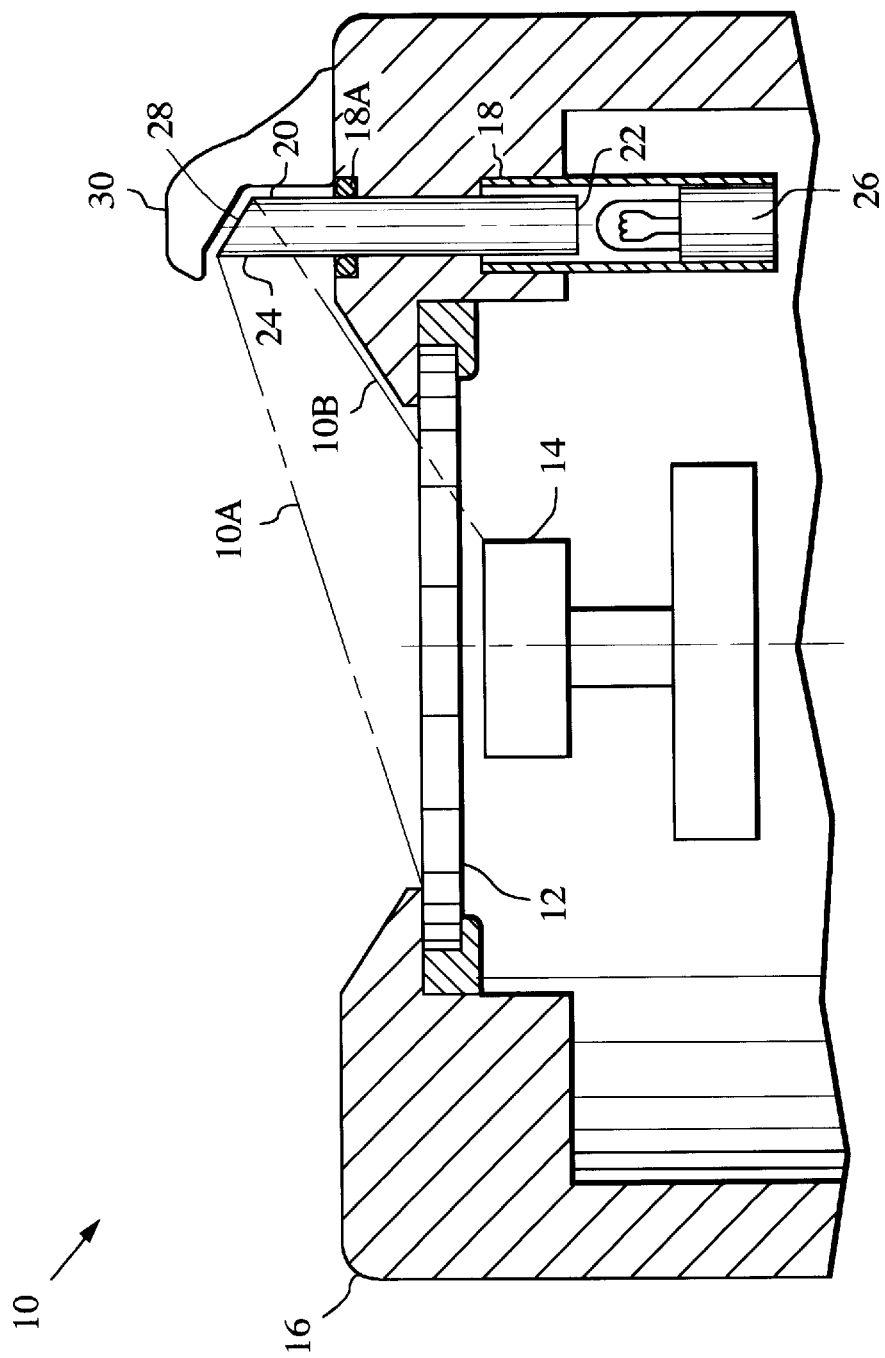
FIG. 1 is a diagrammatic cross-section of an optical radiation detector embodying features of the invention.

Referring first to FIG. 1, a preferred embodiment of an optical flame detector 10 in accordance with the invention is shown in a cross-sectional side view. The optical flame detector 10 has an optical window 12 made of an optically transparent material such as quartz or sapphire. Behind this window is placed the optical radiation detector 14 which may be either an ultraviolet detector or an infrared detector depending on the optical wavelength to be monitored. The optical window 12 is retained in a housing cover 16. The clear aperture of this window together with the optical detector's characteristics determines the field of view of the detector 10.

The housing cover 16 has a circular hole 18 adjacent to the window 12, in which the straight light rod 20 made of quartz, sapphire or other suitable material is mounted, using mounting means, such as, but not limited to, an o-ring 18A and epoxy. The exterior surface of the light rod 20 is metallized, e.g. with aluminum, except at the light entrance 22 and the light exit aperture 24. Light generated by the optical source 26 is transmitted through the light rod and reflected off the metallized bevel edge 28. In a variation of this technique, only the bevel surface 28 is metallized, and still provides satisfactory performance. However, coating the circumferential periphery of the light rod 20 with metal results in an improved light guiding action and also reduces the effects of contaminants and epoxy on losses during the light transmission. The metal coating of the light rod is overcoated with a protective coating such as silicon monoxide for better durability and corrosion protection.

As shown in FIG. 1 the light rod 20 is protected by means of a mechanical guard or cover 30 made of metal or plastic. The light rod guard is so positioned as to provide adequate protection to the light rod on its sides and above the bevel, but does not create increased obstruction to the optical field of view which is shown by the dotted lines 10A, 10B. The use of the straight light rod 20 extending along the side of the optical window, instead of a rod bent over the optical window, results in an increased field of view of the flame detector due to the reduced obstruction.

Figure 2:
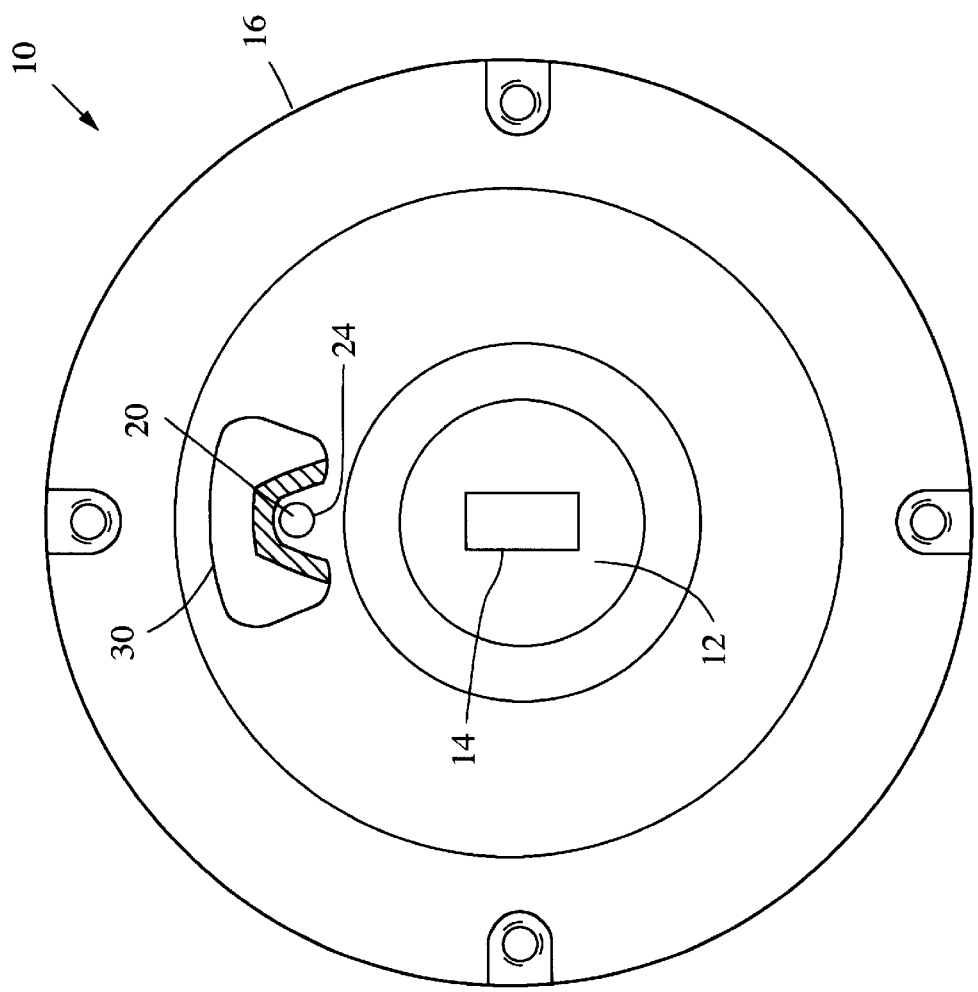
FIG. 2 is a front view of the detector of FIG. 1, with a UV optical flame detector.

FIG. 2 is a front view of the optical detector 10 of FIG. 1. This embodiment of an optical flame detector has a single optical radiation detector element 14, which in this exemplary embodiment is a tube-type ultraviolet detector sensitive to wavelengths from 185 to 245 nanometers. Since these tube-type radiation detectors are relatively large with an area of a few square cm, the exit aperture 24 on the light rod 20 is designed so as to flood the entire optical detector element 14 and the large optical window, as illustrated by the exit aperture 24 in FIG. 1. This is an improvement over bent rod optical detector structures, where illuminating the entire large window is difficult. If the single detector element 14 behind the window 12 is replaced by a CCD or infrared array with lens and optical filter, the embodiment of FIGS. 1 and 2 is applicable to checking the window or lens cleanliness as well as the operation of a camera or imager.

Figure 3:
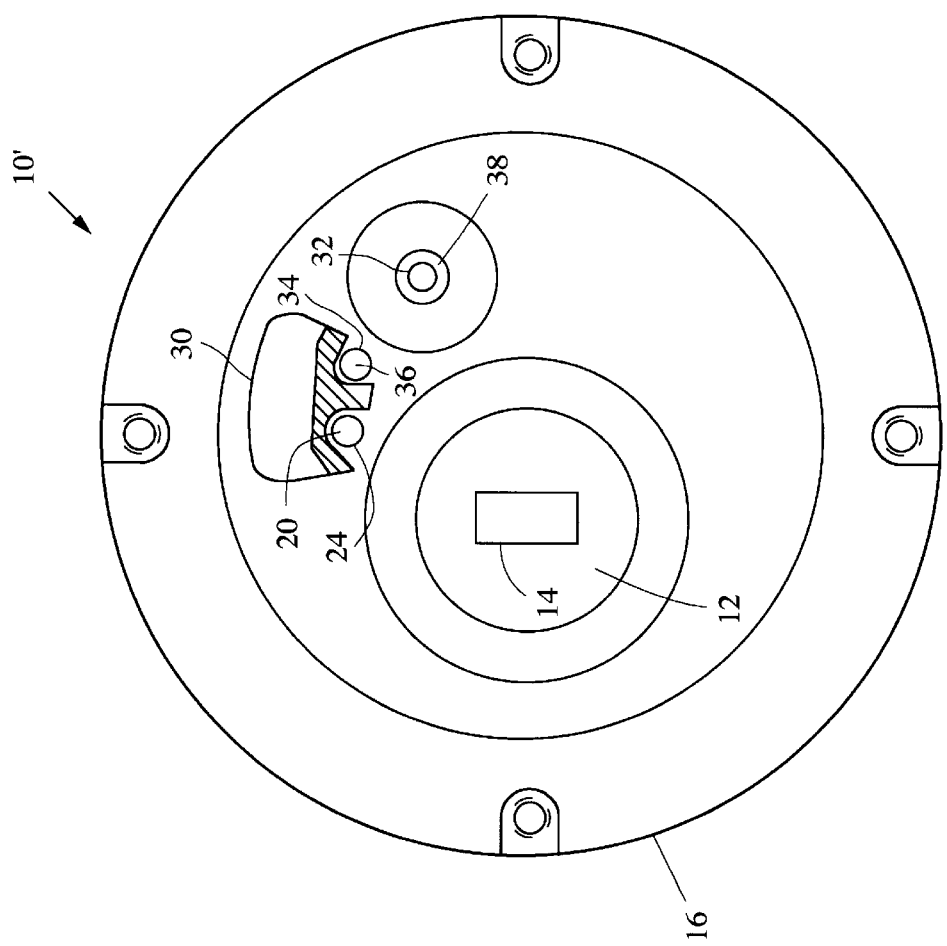
FIG. 3 is a front view of a first alternate embodiment an optical flame detector in accordance with the invention, with both UV and IR optical flame detectors.

FIG. 3 shows the front end of an optical flame detector 10' utilizing both an ultraviolet detector element 14 and an infrared detector 32, illuminated by light rods 20 and 34 with respective separate light sources. The infrared detector 32 is sensitive to radiation between 4.2 and 4.8 microns wavelength and measures the emissions from hot carbon-dioxide in a flame. Suitable infrared detectors such as pyroelectrics, thermopiles and lead selenide are only a few square millimeters in area and are packaged in TO-5 style headers with optical filters installed in the cover (TO-style headers are industry-standard electronic packages, TO-5 having a diameter of 0.36 inch). Hence, the optical viewing window 38 for the infrared detector 32 is proportionately smaller than the optical window 12 for the ultraviolet detector 14. The light beam emerging from the exit aperture 34 of the light rod 36 for the infrared detector 32 is designed to create a narrower light beam to illuminate the smaller detector 32 and optical window 38. The light rod 20 is as described with respect to the embodiment of FIGS. 1 and 2.

Figure 4:
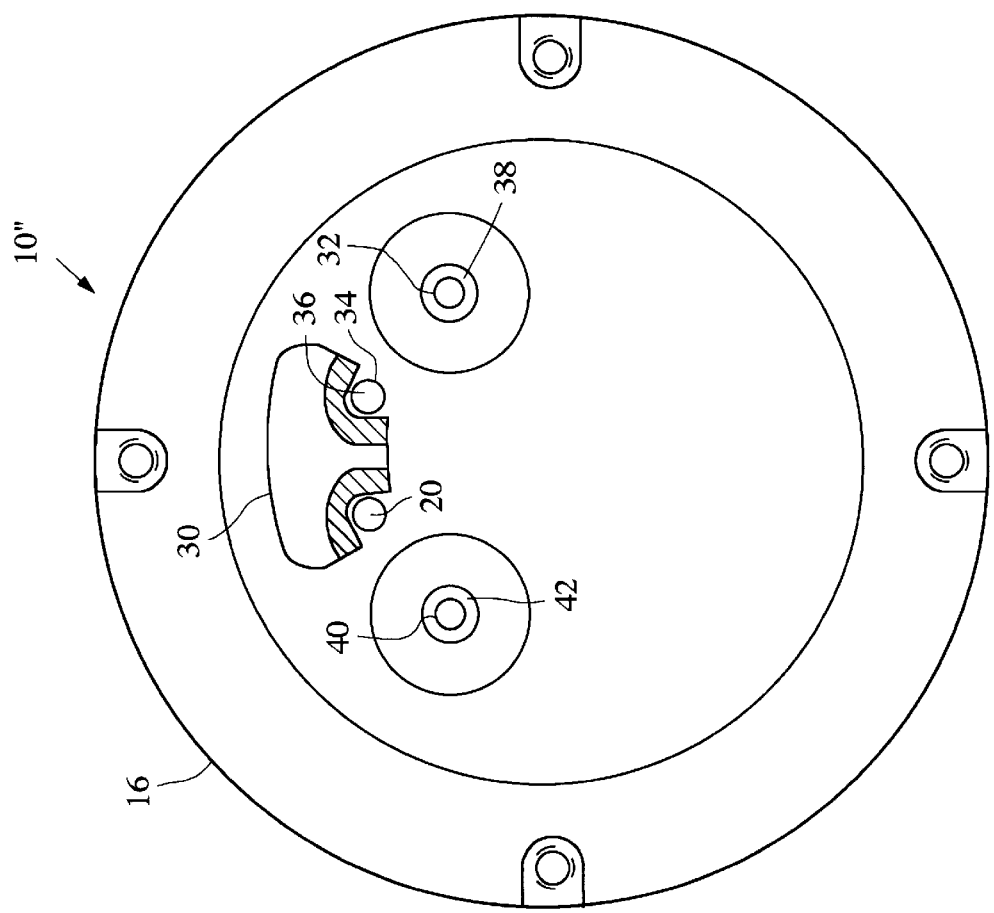
FIG. 4 is a front view of a second alternate embodiment of the invention, with a dual IR optical flame detector.

FIG. 4 shows the front end of an optical flame detector 10" utilizing two infrared detectors 32 and 40, respectively illuminated by respective light rods 20 and 36 with separate light sources. The first infrared detector 32 detects incoming radiation in the 4.2 to 4.8 micrometer range, while the second infrared detector 40 looks at incoming radiation in a different infrared wavelength range and is used in false alarm discrimination. The second detector 40 could also be a different type of infrared detector which provides additional information in the 4.2 to 4.8 micron wavelength range.

The schemes described above are clearly not limited to the examples of single and dual optical flame detectors. Any optical (ultraviolet through infrared) detector, infrared or CCD array could utilize this COPM scheme for applications ranging from optical flame detection to imaging, surveillance and weapons. Cleanliness of the outer optical element in these other applications is conventionally checked chiefly by human eye, either by viewing the instrument externally or internally through the optical train. Additionally, the COPM test in accordance with this invention can also provide information about the operation of the whole instrument.

Figure 5:
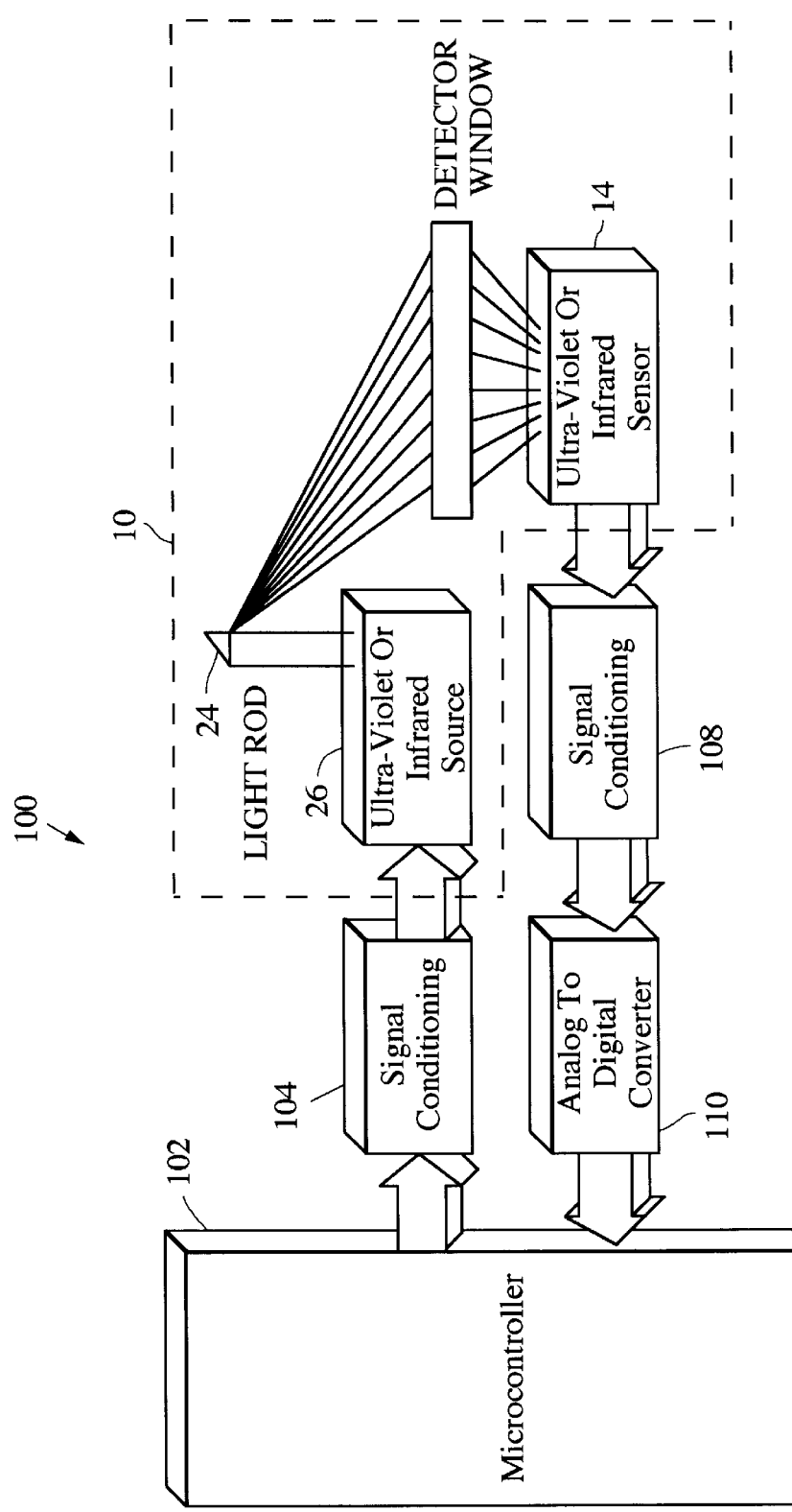
FIG. 5 is a schematic block diagram of a test system for testing the optical radiation detector of FIG. 1.

FIG. 5 is a schematic block diagram of a test system 100 for testing the detector 10. It is noted that the test system has previously been used to test detectors with different optical schemes than those illustrated in FIGS. 1–4. A microcontroller 102 is operable in a test mode to generate control signals which are conditioned by signal conditioning function 104, and used to control or drive the light source 26 of the detector 10. In the test mode, the sensor 14 responds to the light generated by the source 14, and generates responsive signals which are conditioned by signal conditioning function 108, converted from analog to digital form, and provided to I/O ports of the microcontroller 102. The microcontroller 102 compares the signals output by the sensor to expected results, to determine whether the sensor test is normal.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An optical radiation detection apparatus, comprising:
   a housing with one or more optical windows having one or more external surfaces;
   one or more optical radiation detectors disposed within the housing behind the one or more optical windows, said one or more optical detectors responsive to incoming radiation passing through the one or more optical windows to generate detector signals;
   one or more optically transmissive rods mounted into the housing adjacent to the one or more optical windows, said one or more optical rods having a reflective bevel at an external extremity outside the housing; and
   light source apparatus positioned relative to the one or more optical rods to cause test light from the light source apparatus to transmit through the one or more optical rods and reflect off the reflective bevel onto the one or more external surfaces of the one or more optical windows, and to pass through the one or more optical windows onto the one or more radiation detectors, wherein said test light passes through the same one or more optical windows through which said incoming light energy passes.

2. The apparatus of claim 1 wherein said one or more optical radiation detectors comprises an ultraviolet detector.

3. The apparatus of claim 1 wherein said one or more optical radiation detectors comprises an infrared detector.

4. The apparatus of claim 1 wherein said one or more optical radiation detectors comprises a combination of an ultraviolet radiation detector and an infrared radiation detector.

5. The apparatus of claim 1 wherein said light source apparatus is disposed inside said housing.

6. The apparatus of claim 1 wherein said one or more optical radiation detectors comprises a combination of two or more infrared detectors.

7. The apparatus of claim 1 wherein said one or more optical radiation detectors comprises a CCD array.

8. The apparatus of claim 1 wherein said one or more optical radiation detectors comprises an infrared array.

9. The apparatus of claim 1 wherein the one or more optically transmissive rods is made of quartz.

10. The apparatus of claim 1 wherein the one or more optically transmissive rods is made of sapphire.

11. The apparatus of claim 1 wherein circumferential sides of the one or more optically transmissive rods are coated with an optically reflective coating, said coating having entry and exit apertures for light transmission from the light source apparatus to the one or more optical windows and the one or more detectors.

12. The apparatus of claim 1 further comprising a projecting cover on the housing for mechanically protecting a portion of the one or more light rods exposed from the housing.

13. The apparatus of claim 1 wherein the one or more light rods includes a straight rod.

14. An optical radiation detection apparatus, comprising:
    a housing with at least one optical window;
    one or more optical radiation detectors disposed within the housing behind the at least one optical window;
    a straight optically transmissive rod mounted into the housing adjacent to the at least one optical window, said optical rod having a metallized reflective bevel at an external extremity; and
    a light source located inside the housing positioned relative to the optical rod to cause light from the light source to transmit through the optical rod and reflect off the reflective bevel onto the at least one optical window and the radiation detector.

15. The apparatus of claim 14 wherein said one or more optical radiation detectors comprises an ultraviolet detector.

16. The apparatus of claim 14 wherein said one or more optical radiation detectors comprises an infrared detector.

17. The apparatus of claim 14 wherein said one or more optical radiation detectors comprises a combination of an ultraviolet radiation detector and an infrared radiation detector.

18. The apparatus of claim 14 wherein said one or more optical radiation detectors comprises a combination of two or more infrared detectors.

19. The apparatus of claim 14 wherein said one or more optical radiation detectors comprises a CCD array.

20. The apparatus of claim 14 wherein said one or more optical radiation detectors comprises an infrared array.

21. The apparatus of claim 14 wherein the optically transmissive rod is made of quartz.

22. The apparatus of claim 14 wherein the optically transmissive rod is made of sapphire.

23. The apparatus of claim 14 wherein circumferential sides of the optically transmissive rod are metallized, said metallization having entry and exit apertures for light transmission from the light source to the at least one optical window and the one or more detectors.

24. The apparatus of claim 14 wherein said at least one optical window comprises an optical lens, said optical lens being the outermost optical element in the apparatus.

25. A system for testing an optical radiation detector, comprising:
    an optical radiation detector apparatus, comprising a housing with at least one optical window, at least one optical radiation detector disposed within the housing behind the at least one optical window and responsive to incoming radiation passing through the one or more optical windows to generate electrical detector signals indicative of an intensity level of incident light energy, an optically transmissive rod mounted into the housing adjacent to the at least one optical window, said optical rod having a reflective bevel at an external extremity outside the housing, and a light source to cause test light from the light source to transmit through the optical rod and reflect off the reflective bevel onto an external surface of the at least one optical window, to pass through the at least one optical window and onto the at least one radiation detector, wherein said test light passes through the same at least one optical window through which said incident light energy passes;

a controller apparatus for generating signals for controlling the operation of the light source, said controller apparatus connected to said detector to receive said detector signals, said controller apparatus adapted to determine a functional status of said optical radiation detector apparatus.

26. A method for testing the function of an optical detector apparatus having a housing with one or more optical windows, and one or more optical radiation detectors disposed within the housing behind the one or more optical windows, the method comprising a sequence of the following steps:

providing an optically transmissive rod mounted into the housing adjacent to the optical window, said optical rod having a reflective bevel at an external extremity outside the housing, the light rod oriented with respect to said one or more windows such that there is no horizontal projection of the rod over a surface of said one or more windows with the windows in a generally horizontal position; and passing light from an input end of the rod located inside the housing through the rod to cause light to reflect off the reflective bevel onto the optical window and the radiation detector, thereby providing a test light illumination of the one or more detectors through the window.

27. An optical radiation detection apparatus, comprising:

a housing with an optical window having an external surface;

an optical radiation detector disposed within the housing, said optical detector responsive to incoming radiation from a fire or explosion passing through said optical window to generate detector signals;

an optically transmissive rod mounted into the housing adjacent to the optical window, said optical rod having a reflective bevel at an external extremity outside the housing; and a light source positioned inside the housing and relative to the optical rod to cause test light from the light source to transmit through the optical rod and reflect off the reflective bevel onto the external surface of the optical window, and to pass through the optical window onto the radiation detector, wherein said test light passes through the same optical window through which passes said incoming light energy from a fire or explosion.

28. The apparatus of claim 27 wherein the light rod is a straight rod.

29. The apparatus of claim 27 wherein the housing is an explosion proof housing.

* * * * *